US008534082B2

(12) United States Patent
Price et al.

(10) Patent No.: US 8,534,082 B2
(45) Date of Patent: Sep. 17, 2013

(54) ENGINE STARTER PREDICTIVE MAINTENANCE SYSTEM

(75) Inventors: Daniel L. Price, Bloomington, MN (US); Greg R. Truckenbrod, Minneapolis, MN (US); Ross T. Nelson, St. Paul, MN (US)

(73) Assignee: Thermo King Corporation, Minneapolis, MN (US)

( * ) Notice: Subject to any disclaimer, the term of this patent is extended or adjusted under 35 U.S.C. 154(b) by 676 days.

(21) Appl. No.: 12/839,970

(22) Filed: Jul. 20, 2010

(65) Prior Publication Data

US 2012/0017618 A1 Jan. 26, 2012

(51) Int. Cl.

| | |
|---|---|
| ***F25B 49/00*** | (2006.01) |
| ***F25B 27/00*** | (2006.01) |
| ***F02M 1/04*** | (2006.01) |
| ***F02M 11/08*** | (2006.01) |
| ***B60Q 1/00*** | (2006.01) |
| ***G06F 7/00*** | (2006.01) |

(52) U.S. Cl.
USPC .... 62/127; 62/323.1; 123/179.3; 123/179.14; 340/438; 701/34.4

(58) Field of Classification Search
USPC .................. 62/127, 323.1; 123/179.1, 179.3, 123/179.14, 179.15; 701/29.1, 34.4; 340/438, 340/455
See application file for complete search history.

(56) References Cited

U.S. PATENT DOCUMENTS

| | | | |
|---|---|---|---|
| 3,723,964 | A | 3/1973 | Lace |
| 5,961,567 | A | 10/1999 | Azzaro et al. |
| 5,968,107 | A | 10/1999 | Vogan et al. |
| 6,119,074 | A | 9/2000 | Sarangapani |
| 6,234,010 | B1 | 5/2001 | Zavarehi et al. |
| 6,281,598 | B1 | 8/2001 | King et al. |
| 6,291,902 | B1 | 9/2001 | Ogane et al. |
| 6,339,742 | B2 | 1/2002 | Weisman, II |
| 6,347,267 | B1 | 2/2002 | Murakami |
| 6,405,108 | B1 | 6/2002 | Patel et al. |
| 6,424,157 | B1 | 7/2002 | Gollomp et al. |
| 6,761,153 | B1 | 7/2004 | Lewis et al. |
| 6,840,236 | B2 | 1/2005 | Takahashi et al. |
| 6,961,652 | B2 | 11/2005 | Amano |
| 7,126,341 | B2 | 10/2006 | Bertness et al. |
| 7,319,926 | B2 | 1/2008 | Suzuki |
| 7,571,046 | B2 | 8/2009 | Weng |
| 7,614,377 | B2 | 11/2009 | Noguchi |
| 7,650,211 | B2 | 1/2010 | Wang et al. |
| 2005/0182536 | A1 | 8/2005 | Doyle et al. |
| 2008/0295726 | A1 | 12/2008 | Cooper et al. |
| 2009/0038586 | A1 | 2/2009 | Andri |
| 2009/0240390 | A1 | 9/2009 | Nenadic et al. |
| 2009/0254240 | A1 | 10/2009 | Olsen, III et al. |
| 2009/0309530 | A1 | 12/2009 | Shin |

*Primary Examiner* — Chen Wen Jiang

(74) *Attorney, Agent, or Firm* — Michael Best & Friedrich LLP

(57) ABSTRACT

An engine starter system that predicts when starter failure is imminent. The engine starter system monitors engine starter crank speed, battery voltage and ambient air temperature. The crank speed, battery voltage and ambient air temperature are communicated to a controller which compares the crank speed for the measured battery voltage and air temperature to a predicted crank speed for the measured battery voltage and air temperature. If the crank speed is lower than the predicted crank speed, a signal is sent to an alarm.

20 Claims, 3 Drawing Sheets

ENGINE STARTER PREDICTIVE MAINTENANCE SYSTEM

BACKGROUND

The present invention relates to an engine starter predictive maintenance system. Engine starters are known to fail periodically. An engine starter failure in a transport refrigeration unit can result in downtime for a transport trailer and the loss of goods in the transport trailer.

SUMMARY

In one embodiment, the invention provides an engine starter system for an engine. The engine starter system includes an engine starter operable to engage the engine and rotate at a crank speed. The system also includes a battery in electrical communication with the engine starter, a crank speed sensor operable to measure the crank speed of the engine starter, a voltage sensor operable to measure the voltage of the battery, and a temperature sensor operable to measure the ambient air temperature. An additional component of the system is a controller in electrical communication with the engine starter, the crank speed sensor, the voltage sensor, and the temperature sensor, wherein the controller is programmed with predicted engine crank speed values based on battery voltage and ambient air temperature. The controller compares the measured crank speed of the engine starter to the predicted crank speed value for the measured battery voltage and measured ambient air temperature.

In another embodiment, the invention provides a method of operating an engine starter. The method includes engaging an engine with an engine starter, rotating the engine starter at a crank speed, measuring the crank speed of the engine starter, measuring the voltage of a battery in electrical communication with the engine starter, and measuring the ambient air temperature. The method also includes comparing the measured crank speed to a programmed predicted crank speed value for the measured battery voltage and ambient air temperature.

In yet another embodiment, the invention provides a transport refrigeration system. The system includes an engine, a refrigeration system including a compressor driven by the engine, an engine starter engageable with the engine and rotatable at a crank speed, a battery in electrical communication with the engine starter, a crank speed sensor operable to measure the crank speed of the engine starter, a voltage sensor operable to measure the voltage of the battery, and a temperature sensor operable to measure the ambient air temperature. The system also includes a controller in electrical communication with the engine starter, the crank speed sensor, the voltage sensor, and the temperature sensor. The controller is programmed with predicted engine crank speed values based on battery voltage and ambient air temperature. The controller compares the measured crank speed of the engine starter to the predicted crank speed value for the measured battery voltage and measured ambient air temperature.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
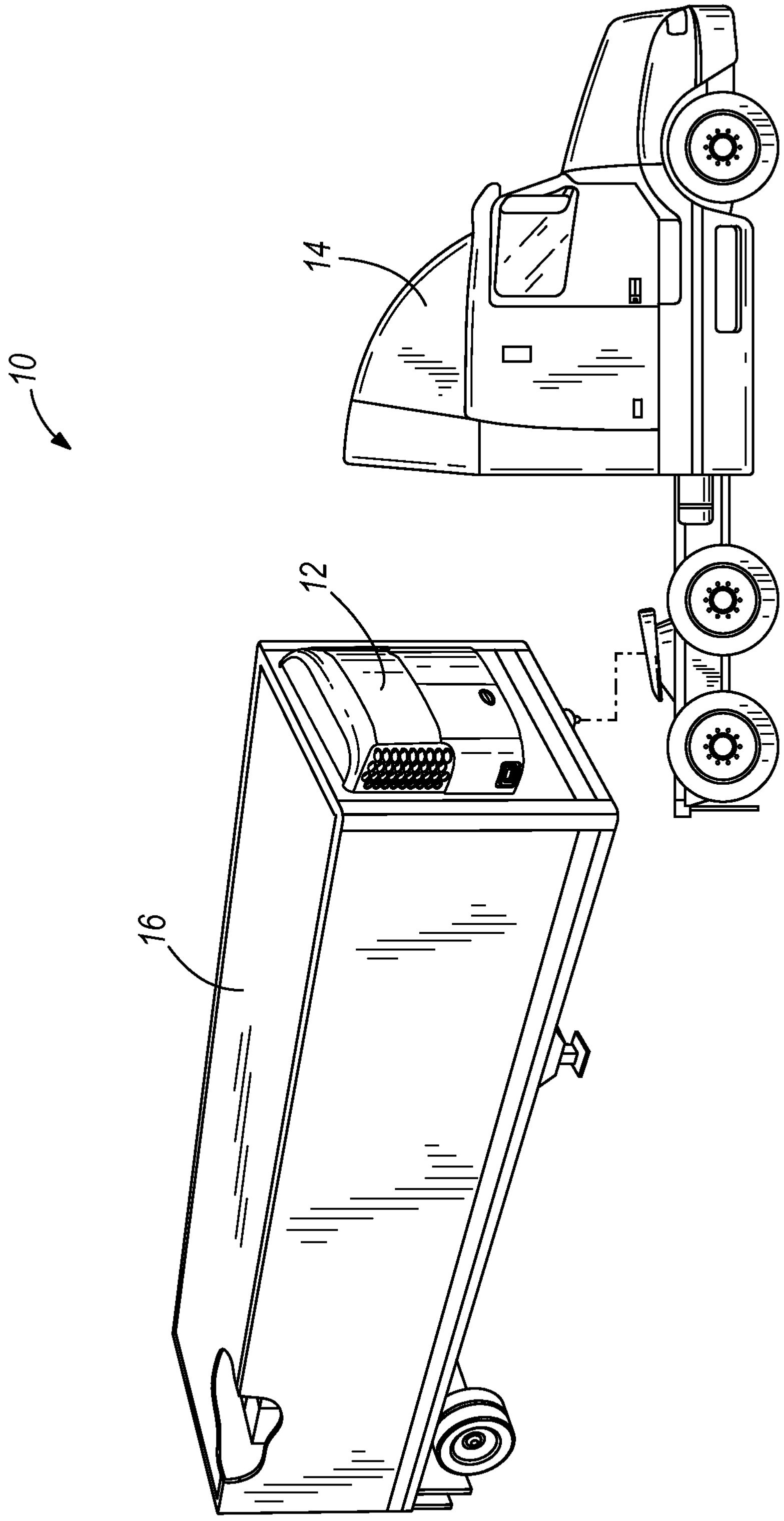
FIG. 1 is a perspective view of a vehicle including a transport refrigeration system.

FIG. 1 is a perspective view of a vehicle 10 including a transport refrigeration system 12. The vehicle 10 includes a tractor 14 and trailer 16. Goods are placed in the trailer 16 for transport. The transport refrigeration system 12 is coupled to the front of the trailer 16 and serves to maintain the interior of the trailer 16 at a temperature. With additional reference to FIG. 2, the transport refrigeration system 12 includes a diesel engine 18, an engine starter 20, a battery 22, and a refrigeration system 24, which includes a compressor (not shown), condenser (not shown), evaporator (not shown), and one or more fans (not shown). In the illustrated embodiment an engine starter system 26 is shown as part of a transport refrigeration system 12 on a trailer 16, but can also be used on other cargo transportation systems such as rail cars, shipping containers, trucks, and the like. In addition, the engine starter system 26 can be used with any internal combustion engine not limited to transport refrigeration applications.

Figure 2:
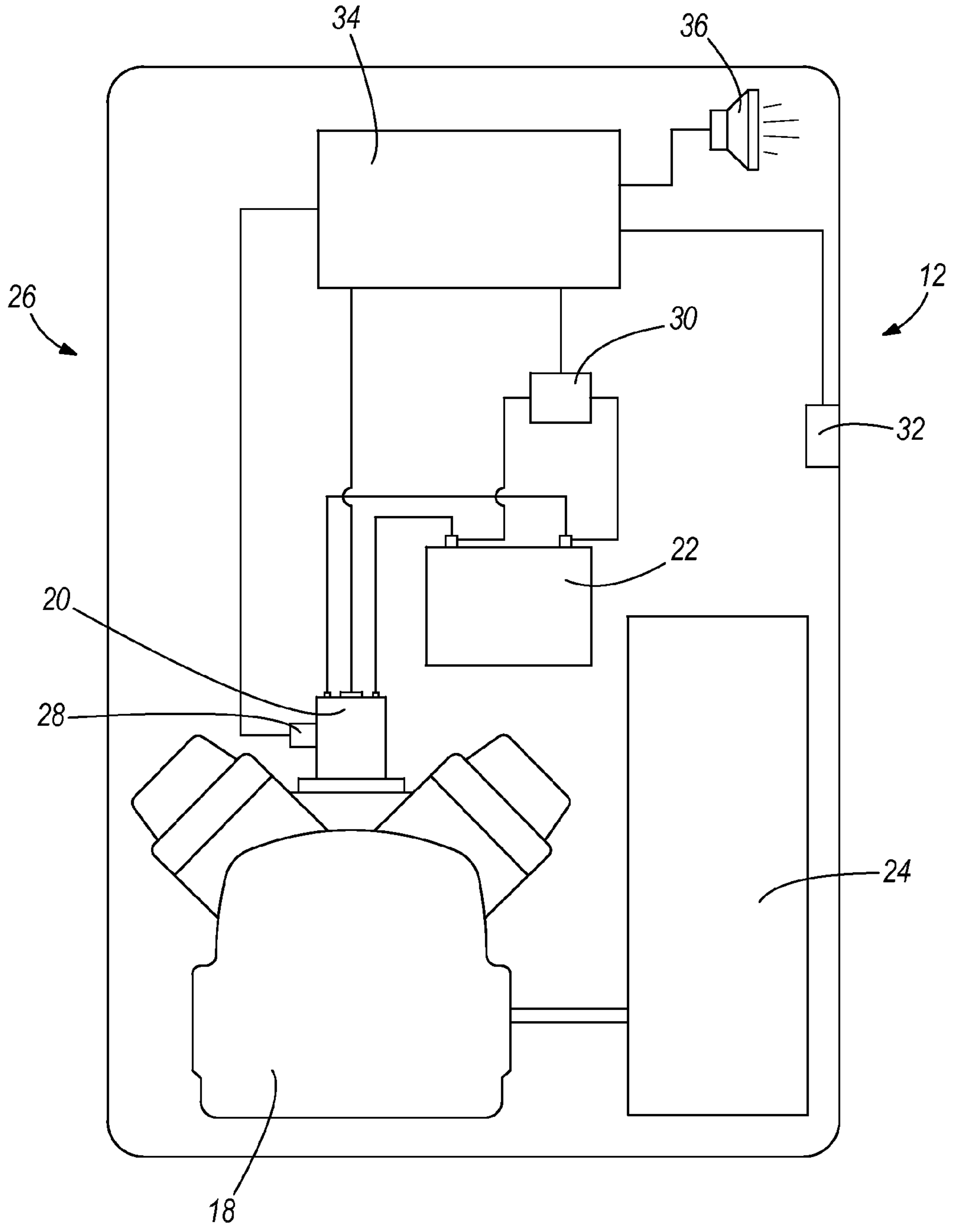
FIG. 2 is a schematic of an engine starter system.

FIG. 2 is a schematic view of the engine starter system 26. The engine starter 20 is electrically coupled to the battery 22. A crank speed sensor 28 is coupled to the engine starter 20 and is operable to measure the crank speed of the engine starter 20. A voltage monitor 30 is electrically coupled to the battery 22 and is operable to measure the voltage of the battery 22. A temperature sensor 32 is operable to measure the ambient air temperature. The temperature sensor 32 need not be coupled to the engine starter 20. A controller 34 is in communication with the engine starter 20, the crank speed sensor 28, the voltage monitor 30, and the temperature sensor 32. The controller 34 is programmed with predicted engine 18 crank speed values based on battery voltage and ambient air temperature.

Figure 3:
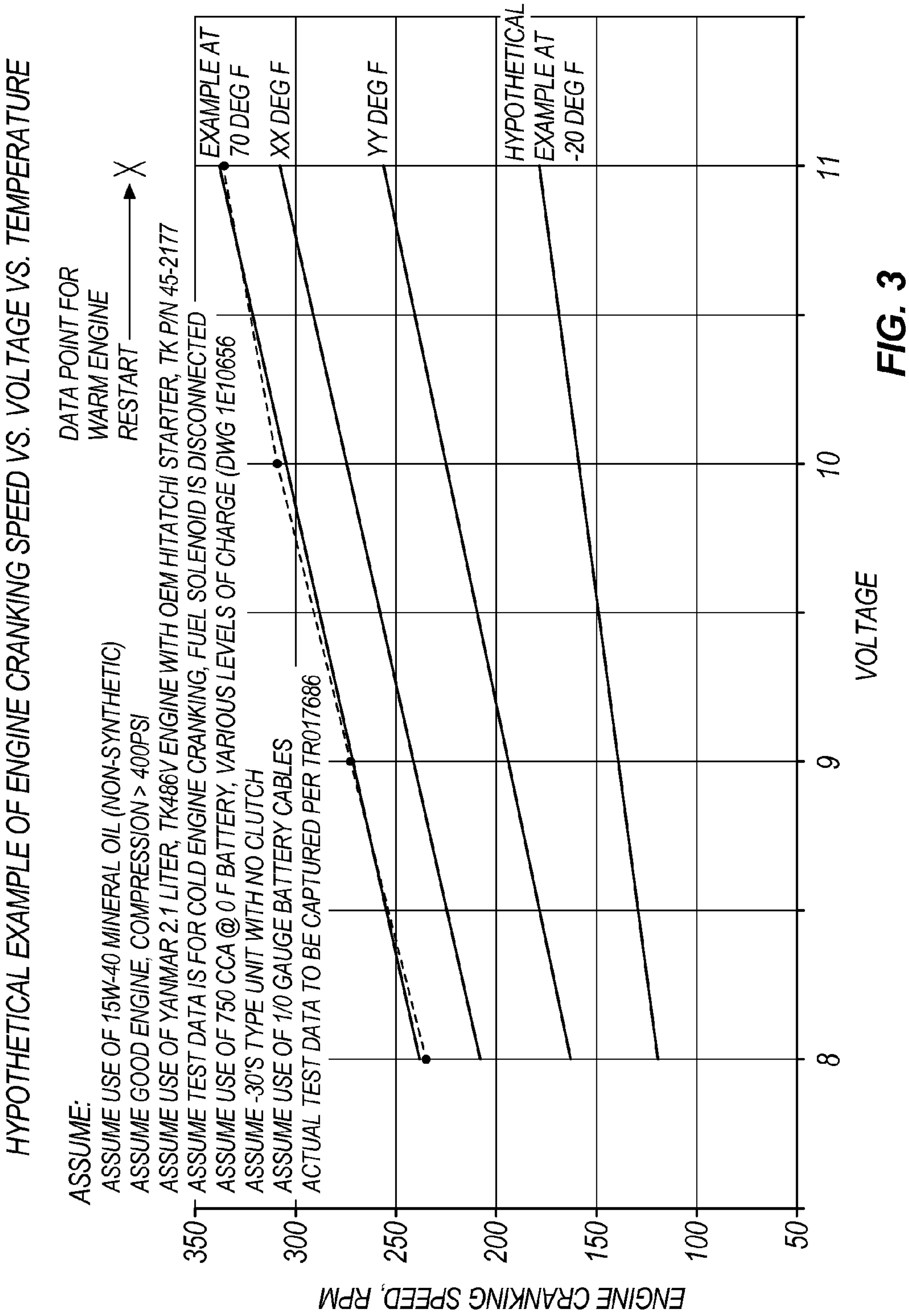
FIG. 3 is a graph showing a hypothetical example of engine cranking speed vs. voltage vs. temperature.

FIG. 3 is a graph showing a hypothetical example of engine 18 cranking speed vs. voltage. The X-axis of the graph is battery voltage, and the Y-axis of the graph is engine 18 cranking speed in rotations per minute (rpm). A number of lines are plotted on the graph, each line corresponding to an ambient air temperature. The graph is produced by plotting data that is captured during actual testing. During testing a known good engine 18 and a known good engine starter 20 are used for testing. Engine 18 cranking speed may vary depending on the engine 18 model and engine starter 20 model being used. The graph shown in FIG. 3 is a hypothetical graph for a Yanmar 2.1 liter, TK486V engine 18 with an OEM Hitatchi engine starter 20, TK part number 45-2177. The test data assumes use of 15W-40 mineral oil (non-synthetic), a cold-cranking cycle with the fuel solenoid disconnected, a battery 22 rated at 750 CCA at O degrees Fahrenheit, and 1/0 gauge battery cables.

The engine starter system 26 functions as follows. During a pre-trip routine, the engine starter 20 receives a signal from the controller 34 to start the engine 18. Before the engine 18 starts cranking, the controller 34 communicates with the voltage monitor 30 and the temperature sensor 32 to receive the current battery 22 voltage and ambient air temperature. The engine starter 20 then cold-cranks the engine 18 without supplying fuel to the engine 18 until a signal is received telling the engine starter 20 to stop cranking. While the engine 18 is cranking the crank speed sensor 28 measures the crank speed of the engine starter 20. The controller 34 then communicates with the crank speed sensor 28 to receive the crank speed. Next, the controller 34 compares the actual crank speed to a predicted crank speed for the measured battery 22 voltage and ambient air temperature. If the actual crank speed is less than the predicted crank speed, then the controller 34 sends a signal to trigger an alarm 36. In an alternative embodiment, the crank speed sensor 28 measures the battery 22 voltage while the engine starter 20 is cranking. The controller 34 is also programmed with a predicted crank speed at a given ambient air temperature and a battery 22 voltage that is measured while the engine starter 20 is cranking. The alarm 36 can be one or more of an audible alarm, a visual alarm, and an alarm code displayed along with pre-trip diagnostic results. The alarm 36 may be displayed on one or more of the trailer 16, the tractor 14, a computer (not shown), and a diagnostic machine (not shown). In one embodiment the signal to trigger the alarm 36 is transmitted wirelessly.

In another embodiment the controller 34 triggers an alarm 36 when the measured crank speed is less than the product of the predicted crank speed value multiplied by a sensitivity factor. The sensitivity factor is a value between 0 and 1. The sensitivity factor may be set by the engine starter system 26 manufacturer. In an alternative embodiment, the sensitivity factor is adjustable by the operator. The sensitivity factor allows the engine starter system 26 to be more or less sensitive, depending on the needs of the operator. In another embodiment the controller 34 sends a signal to indicate that the engine starter 20 is functioning properly when the measured crank speed is equal to or more than the product of the predicted crank speed value multiplied by a sensitivity factor.

In an alternative embodiment, the crank speed sensor 28 is coupled to the engine 18. The crank speed sensor 28 measures the speed of the engine 18, communicates the engine 18 speed to the controller 34, and the controller 34 derives the crank speed of the engine starter 20 from the speed of the engine 18. In yet another embodiment, the crank speed sensor 28 is part of an engine control module (ECM) (not shown) and the controller 34 communicates with the ECM to get the engine starter 20 crank speed.

An alternative embodiment of the engine starter system 26 includes counting the number of cranking cycles. A counter (not shown) is connected to the engine starter 20 and counts each cranking cycle that occurs. The counter then communicates the number of cranking cycles that have occurred to the controller 34. The controller 34 is programmed with a lifetime number of cranking cycles and is programmed to trigger an alarm 36 when the number of cranking cycles counted by the counter is equal to or greater than the lifetime number of cranking cycles. The counter is able to be reset by a mechanic when the engine starter is replaced. In another embodiment, the counter and method of counting cranking cycles is used in combination with the other methods and devices described herein.

In yet another embodiment, the engine starter system 26 includes a thermal switch (not shown) coupled to the engine starter housing. The thermal switch can be coupled to the engine starter housing during manufacture of the engine starter 20, or it can be added to the exterior of the housing at a later date. The thermal switch is set to trigger the alarm 36 if the temperature of the engine starter housing is greater than a set temperature. In an alternative embodiment, the thermal switch sends a signal to the controller 34 if the temperature of the engine starter housing is greater than a set temperature. As an example, if the thermal switch is set to trigger an alarm 36 at 250 degrees Fahrenheit, then the alarm 36 will be triggered if the temperature of the engine starter housing is equal to or greater than 250 degrees Fahrenheit. If the temperature of the engine starter housing is less than 250 degrees Fahrenheit, then no alarm 36 is triggered. In another embodiment, the thermal switch and associated alarm 36 is used in combination with other methods and devices described herein.

The alarm 36 is provided to alert the operator and/or maintenance personnel during the pre-trip inspection that the engine starter 20 is not functioning as predicted and should be evaluated for repair or replacement. Replacing an engine starter 20 before it fails during transit is desirable because an engine starter 20 that fails during transit can result in lost cargo due to the transport refrigeration system 12 being unable to function and maintain the cargo at a set temperature. In addition, a failed engine starter 20 can result in downtime for the tractor 14 and trailer 16 while a replacement engine starter 20 is sourced and installed. Hence it is desirable to replace an engine starter 20 before it fails to avoid these additional costs.

Various features and advantages of the invention are set forth in the following claims.

What is claimed is:

1. An engine starter system for an engine, the engine starter system comprising:

an engine starter operable to engage the engine and rotate at a crank speed;

a battery in electrical communication with the engine starter, a crank speed sensor operable to measure the crank speed of the engine starter;

a voltage sensor operable to measure the voltage of the battery;

a temperature sensor operable to measure the ambient air temperature; and a controller in electrical communication with the engine starter, the crank speed sensor, the voltage sensor, and the temperature sensor, wherein the controller is programmed with predicted engine crank speed values based on battery voltage and ambient air temperature, wherein the controller compares the measured crank speed of the engine starter to the predicted crank speed value for the measured battery voltage and measured ambient air temperature.

2. The engine starter system of claim 1, wherein the controller triggers an alarm when the measured crank speed is less than the predicted crank speed value.

3. The engine starter system of claim 1, wherein the controller triggers an alarm when the measured crank speed is less than the product of the predicted crank speed value multiplied by a sensitivity factor.

4. The engine starter system of claim 3, wherein the controller sends a signal to indicate that the starter is functioning properly when the measured crank speed is at least one of equal to and more than the product of the predicted crank speed value multiplied by a sensitivity factor.

5. The engine starter system of claim 3, wherein an operator is able to change the sensitivity factor.

6. A method of operating an engine starter comprising:

engaging an engine with an engine starter;

rotating the engine starter at a crank speed;

measuring the crank speed of the engine starter;

measuring the voltage of a battery in electrical communication with the engine starter;

measuring the ambient air temperature; and comparing the measured crank speed to a programmed predicted crank speed value for the measured battery voltage and ambient air temperature.

7. The method of claim 6, further comprising triggering an alarm to alert a user when the measured crank speed is less than the predicted crank speed value.

8. The method of claim 6, further comprising triggering an alarm when the measured crank speed is less than the product of the predicted crank speed value multiplied by a sensitivity factor.

9. The method of claim 8, further comprising indicating that the starter is functioning properly when the measured crank speed is at least one of equal to and more than the product of the predicted crank speed value multiplied by a sensitivity factor.

10. The method of claim 8, further comprising changing the sensitivity factor.

11. The method of claim 8, further comprising replacing the engine starter with a replacement engine starter after the alarm and prior to failure of the engine starter.

12. The method of claim 6, further comprising programming into a controller predicted engine crank speed values based on battery voltage and ambient air temperature.

13. The method of claim 6, wherein rotating the engine includes rotating the engine during a cold-cranking cycle of a pre-trip routine.

14. A transport refrigeration system comprising:

an engine:

a refrigeration system including a compressor driven by the engine;

an engine starter engageable with the engine and rotateable at a crank speed;

a battery in electrical communication with the engine starter, a crank speed sensor operable to measure the crank speed of the engine starter;

a voltage sensor operable to measure the voltage of the battery;

a temperature sensor operable to measure the ambient air temperature; and a controller in electrical communication with the engine starter, the crank speed sensor, the voltage sensor, and the temperature sensor, wherein the controller is programmed with predicted engine crank speed values based on battery voltage and ambient air temperature, wherein the controller compares the measured crank speed of the engine starter to the predicted crank speed value for the measured battery voltage and measured ambient air temperature.

15. The transport refrigeration system of claim 14, wherein the controller triggers an alarm when the measured crank speed is less than the predicted crank speed value.

16. The transport refrigeration system of claim 14, wherein the controller triggers an alarm when the measured crank speed is less than the product of the predicted crank speed value multiplied by a sensitivity factor.

17. The transport refrigeration system of claim 16, wherein the controller sends a signal to indicate that the starter is functioning properly when the measured crank speed is at least one of equal to and more than the product of the predicted crank speed value multiplied by a sensitivity factor.

18. The transport refrigeration system of claim 16, wherein an operator is able to change the sensitivity factor.

19. The transport refrigeration system of claim 14, wherein the controller controls operation of the refrigeration system.

20. The transport refrigeration system of claim 14, wherein the refrigeration system is operable to condition air supplied to one of a trailer, shipping container, and transportable cargo space.

* * * * *